United States Patent [19]

Takahashi et al.

[11] 4,411,071
[45] Oct. 25, 1983

[54] CHAIN SAW

[75] Inventors: Hiroshi Takahashi, Fussa; Yasuo Saito, Fujisawa, both of Japan

[73] Assignee: Kioritz Corporation, Japan

[21] Appl. No.: 310,351

[22] Filed: Oct. 9, 1981

[30] Foreign Application Priority Data

Oct. 13, 1980 [JP] Japan .................. 55-145337[U]

[51] Int. Cl.³ .................................................. B27B 17/02
[52] U.S. Cl. ....................................................... 30/381
[58] Field of Search ................... 30/381, 382, 383, 384

[56] References Cited

U.S. PATENT DOCUMENTS

| | | | |
|---|---|---|---|
| 3,733,700 | 5/1973 | Notaras | 30/381 |
| 3,849,883 | 11/1974 | Kolorz | 30/381 |
| 3,945,119 | 3/1976 | Nagashima | 30/383 |
| 4,141,143 | 2/1979 | Hirschkoff | 30/381 |
| 4,296,553 | 10/1981 | Dirks | 30/381 |

*Primary Examiner*—Jimmy C. Peters
*Attorney, Agent, or Firm*—Karl W. Flocks; Sheridan Neimark

[57] ABSTRACT

A chain saw having front and rear handles disposed at the front and rear parts of an engine block for driving a saw chain. The front and rear handles are connected at their one ends to the engine block in a vibration absorbing manner through respective vibration damping members. The other ends of the front and rear handles are arranged to oppose to each other at two points and are connected to each other at these two points in a vibration absorbing manner through respective vibration damping members. At least one of the vibration damping members connecting the other ends of the handles is fixed to the engine block.

1 Claim, 3 Drawing Figures

CHAIN SAW

BACKGROUND OF THE INVENTION

The present invention relates to a chain saw and, more particularly, to a vibration damping structure for damping vibration transmitted to handles of the chain saw.

In general, a vibration of large amplitude is transmitted to the handles of a chain saw having an internal combustion engine for driving the saw chain. Various attempts and proposals have been made to effectively damp or attenuate this vibration.

The vibration damping device for the handles of a chain saw has to simultaneously satisfy two incompatible requisites: namely, a rigidity enough to facilitate the handling and operation of the chain saw and to ensure the safety of the work, and a resiliency (vibration absorption) for preventing unfavourable physical influence on the body of the operator. In addition, there are various restrictions in weight, shape and size of the chain saw, because the chain saw is held by both hands of the operator during the operation.

SUMMARY OF THE INVENTION

Accordingly, an object of the invention is to provide a chain saw capable of overcoming the above-described problems of the prior art.

To this end, according to the invention, there is provided a novel chain saw comprising front and rear handles each connected at one of their ends to the body of an engine block for driving a saw chain through resilient members in a manner to absorb vibration, the other ends of said handles being arranged to oppose to each other at two points and connected to each other at these two points through respective resilient members, at least one of said resilient members being connected to the body of the engine block.

The connection of two handles to each other at two points is effective to satisfy both of the requirements for rigidity and resiliency, without substantial increase of size and weight of the chain saw, so that the safety of the work is increased and the unfavourable physical influence is suppressed while facilitating the work conducted with the chain saw.

The above and other objects, as well as advantageous features of the invention will become more clear from the following description of the preferred embodiment taken in conjunction with the accompanying drawings.

BRIEF DESCRIPTION OF THE DRAWINGS

The accompanying drawings in combination show a chain saw constructed in accordance with an embodiment of the invention in which.

DESCRIPTION OF THE PREFERRED EMBODIMENT

Figure 1:
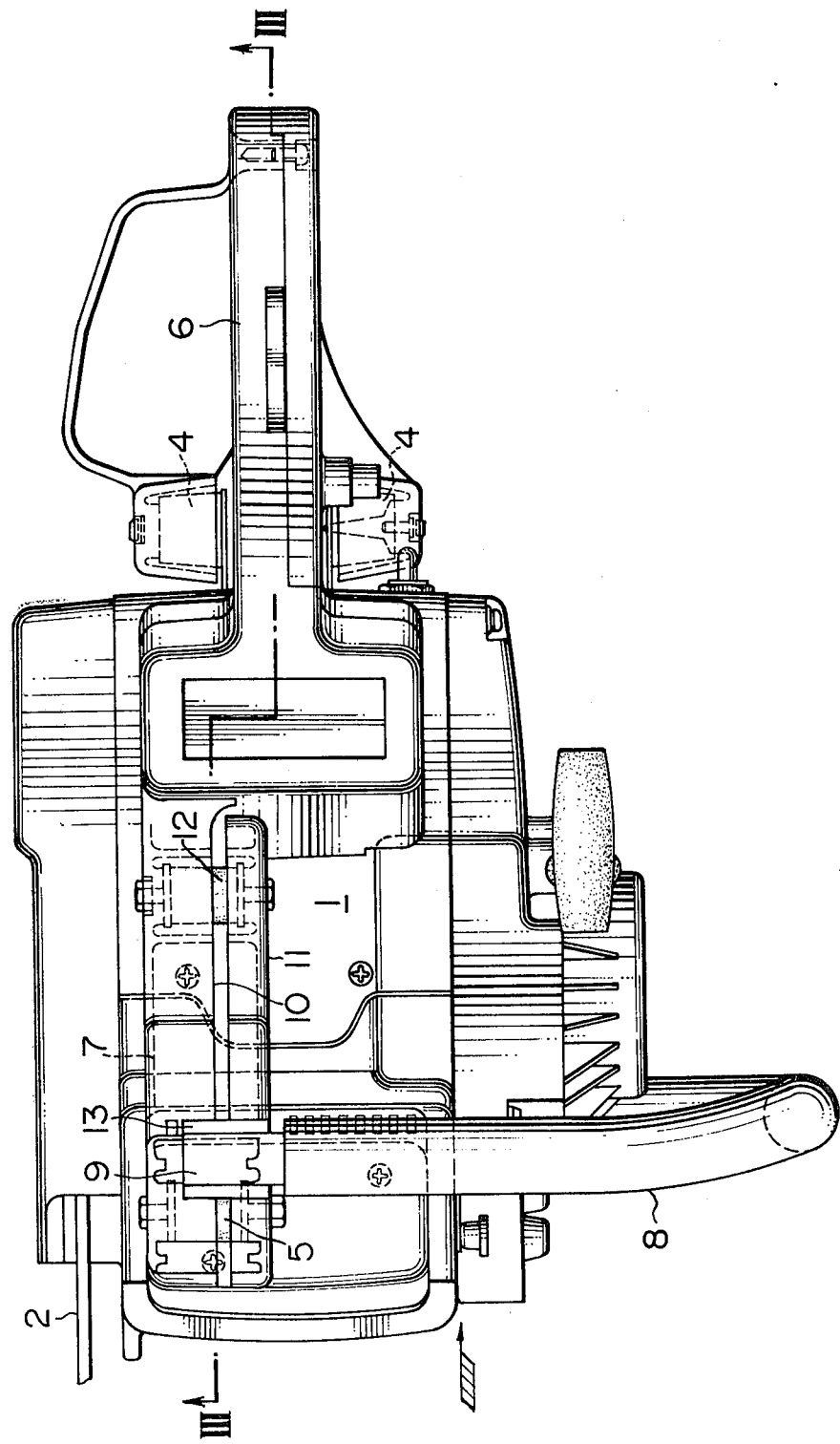
FIG. 1 is a plan view.
Figure 2:
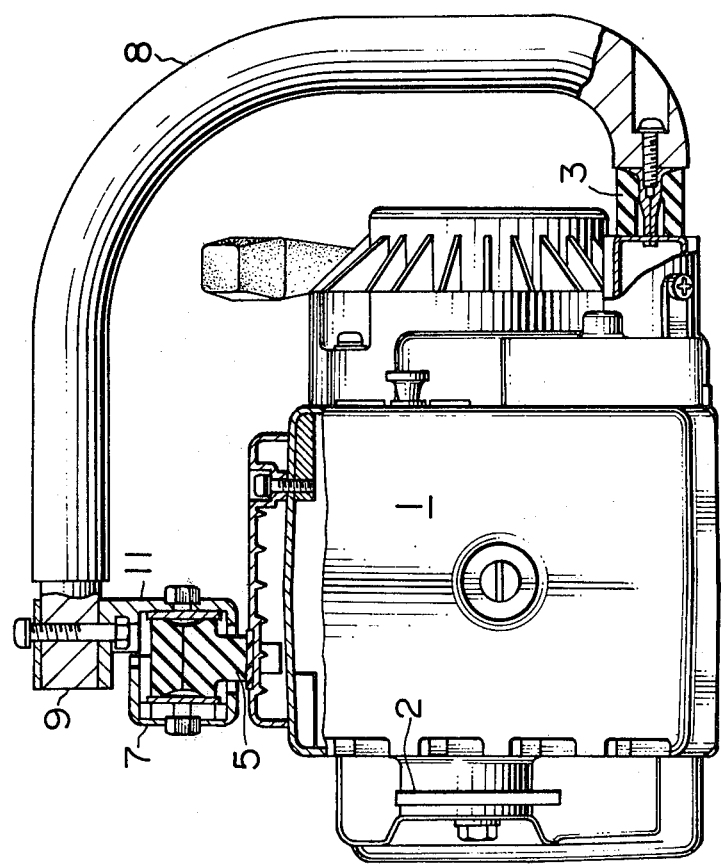
FIG. 2 is a front elevational view viewing from the arrow in FIG. 1 with a front handle shown in section.
Figure 3:
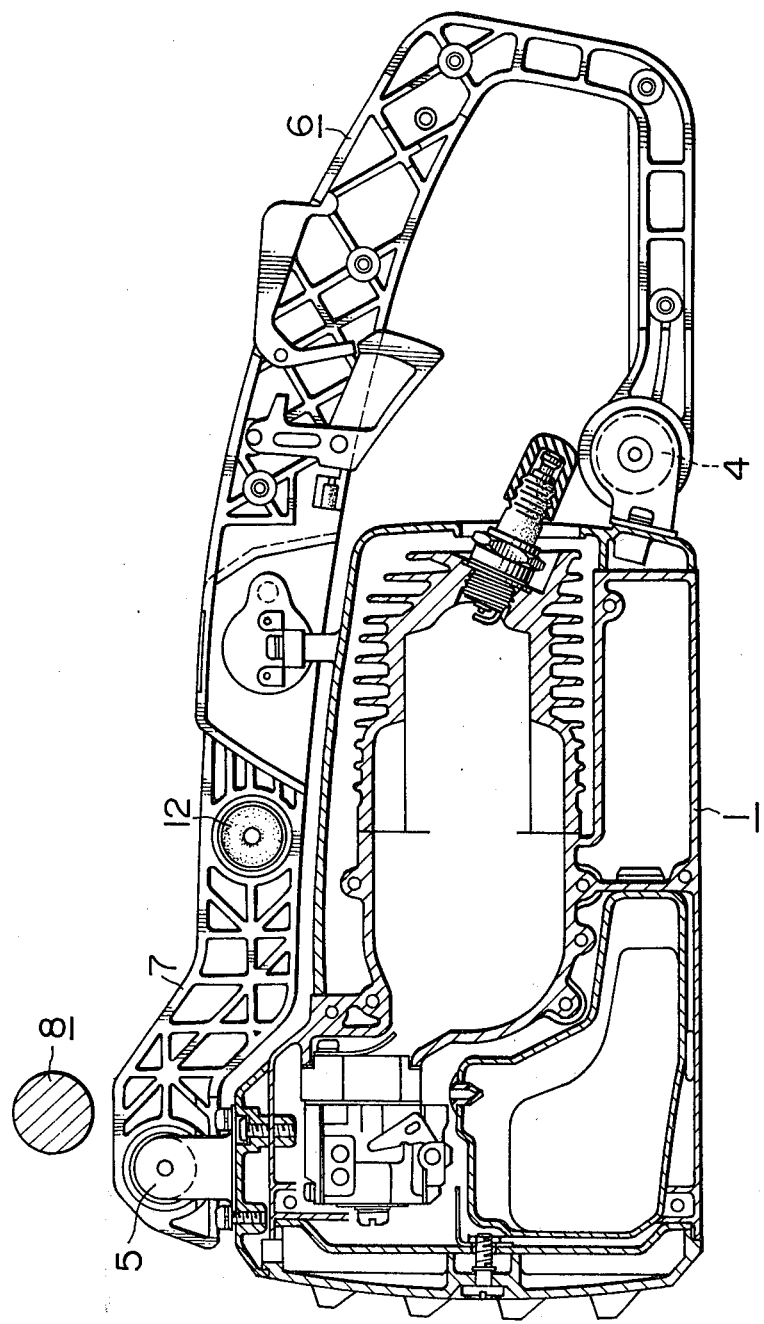
FIG. 3 is a side elevational view taken along the line III—III in FIG. 1 showing an essential part in section.

Referring to the drawings, a chain saw constructed in accordance with an embodiment of the invention has an engine block generally designated at a reference numeral 1 and including an engine unit which in turn involves a saw chain, a guide bar 2, a centrifugal clutch for driving the saw chain, a driving sprocket and so forth.

A front handle 8 has a substantially U-shaped form and is connected at its one end to the lower part of one side surface of the engine block 1 through a vibration damping member 3 made from a resilient material. The front handle 8 is extended around the engine block 1 so that the other end thereof faces the side region of the upper surface of the engine block 1.

A rear handle 6 is fixed to the rear lower end portion of the engine block 1 through vibration damping members 4,4 arranged in parallel with the crank shaft (not shown) of the engine, in such a manner as to project rearwardly from the engine block 1. The rear handle 6 is extended forwardly above the engine block 1 to the front portion of the latter and is connected at its front end to the front end portion of the engine block 1 through a vibration damping member 5.

The vibration damping member 5 has a substantially T-shaped cross-section with three attaching legs. In the illustrated embodiment, the extension 7 of the rear handle 6 is disposed at an offset to one side from the longitudinal axis of the engine block 1. The rear handle 6 is provided with a vibration damping member 12 also at an intermediate portion 10 thereof.

The upper end 9 of the front handle 8 is extended to an area above the extension 7 of the rear handle 6. An attaching member 11 is adapted to be secured in a bridging manner to the extension 7 in a vibration absorbing manner through the vibration damping members 5 and 12. The attaching member 11 has a portion 13 to which the end 9 of the front handle 8 is fixed. Thus, the front and rear handles 8 and 6 are connected to each other in a manner to absorb the vibration.

The attaching member 11 is extended in a side-by-side relation to the extension 7 of the rear handle 6 which makes a right angle to the front handle 8, to ensure rigidity and resiliency of both handles 8 and 6. Thus, the rear and front handles 6 and 8 are constructed to have L-like planar shapes. The deflection of the front handle 8 in the front and rear directions is suppressed by the attaching member 11 which extends in the front and rear directions. Also, the lateral swinging of the rear handle 6 is avoided by the cooperation of the attaching member 11 and the front handle 8.

In the illustrated embodiment, the vibration damping member 12 has a tubular form. This, however, is not exclusive and the vibration damping member 12 also can have a T-like shape to permit the connection of mid portion of the extension 7 to engine block 1 to make sure of the rigid and resilient connection of the rear handle 6 to the engine block 1. Other changes and modifications are possible without departing from the scope of the invention which is limited solely by the appended claim.

What is claimed is:

1. A chain saw comprising: an engine block including an engine for driving a saw chain; and a front and a rear handle provided respectively at the front and rear parts of said engine block, said handles being connected at their one ends to said engine block in a vibration absorbing manner through vibration damping members, while the other ends of said handles oppose to each other and are connected to each other at least at two points through respective vibration damping members, at least one of said vibration damping members connecting said other ends of said handles being substantially T-shaped and connected to said engine block.

* * * * *